United States Patent [19]
Geisel

[11] 3,773,969
[45] Nov. 20, 1973

[54] HATCH FOR A POWER SUPPLY CORD
[76] Inventor: Charles E. Geisel, 55633 Ash Rd., Osceola, Ind. 46561
[22] Filed: Feb. 25, 1972
[21] Appl. No.: 229,316

[52] U.S. Cl. ............... 174/67, 220/24.3, 339/44 R
[51] Int. Cl. ............................................. H05k 5/03
[58] Field of Search ............................. 174/65, 67; 220/24.3, 3.8; 339/34, 36, 37, 44 R; 191/12 R, 12.2 R, 12.4 R

[56] References Cited
UNITED STATES PATENTS
3,613,044 10/1971 Rarick ............... 174/67 X
945,753 1/1910 Chamberlain et al. ............ 220/24.3
3,428,936 2/1969 Arnao ........................ 339/44 R X
3,467,763 9/1969 Shaw ............................ 220/24.3 X Primary Examiner—Bernard A. Gilheany
Assistant Examiner—D. A. Tone
Attorney—Oltsch & Knoblock

[57] ABSTRACT

A hatch for a power supply cord. The hatch includes a housing defining a cord receiving recess. Two openings are formed in the housing in communication with the recess therein. A lid which is pivotally mounted to the housing covers one opening in the housing and is shiftable from a closed position into an open position to allow access into the recess. The lid has an opening therein which allows the power supply cord to extend through the housing when it is connected to a power source. A slidable door is carried by the lid to cover the opening therein when the lid is in its closed position and the power supply cord is withdrawn from the lid opening.

3 Claims, 6 Drawing Figures

PATENTED NOV 20 1973　　　　　　　　　　　　　　3,773,969

3,773,969

HATCH FOR A POWER SUPPLY CORD

BACKGROUND OF THE INVENTION

This invention relates an an improved hatch for a power supply cord which will have specific but not limited use in the mobile home and travel trailer manufacturing art.

Hatches for passing a power supply cord from a mobile home, travel trailer, or similar structure to a power source have been used for several years. The power supply cord which is usually between 20 and 30 feet in length has a flexible body with a plug connected to one end. The opposite end of the cord body is secured to suitable electrical power terminals within the structure. When the power supply cord is not being used, such as when the structure is in transit, the plug of the cord is retained within the housing portion of the hatch with the body of the cord extending through an opening in the rear of the hatch housing portion and between the outer side wall to which the hatch is attached and the inner side wall of the structure. When it is desired to connect the power supply cord to an exterior power supply, the hatch cover is opened and the plug grasped and withdrawn from the hatch, pulling the body of the cord through the hatch. Heretofore, to accommodate the body of the cord when the cord is connected to a power source, hatch lids have been designed with offset marginal edges to provide limited spaces between the lids and the edges of the housing portion openings for the cord. This design of the lids permits insects and rodents to enter the hatch when the cord has been retracted. In those lid designs which do not provide for any cord access, the lid rests in a semi-open position when the cord is connected to a power supply. By not being able to entirely close the lid with the cord connected to the power supply, insects and rodents can find their way into the mobile home or travel trailer through the cord opening in the hatch housing portion. Additionally, the wind has been known to cause the semi-open hatch lid to vibrate thereby creating an unwanted noise and disturbance within the mobile home or travel trailer. In the subject invention, the hatch lid is provided with an opening which permits the lid to make sealing contact with the housing portion of the hatch, thus substantially preventing the entry of insects or rodents into the structure through the hatch when the power supply cord is connected to an exterior power source. When the power cord is retracted, the opening in the hatch lid can be closed.

SUMMARY OF THE INVENTION

The hatch of this invention includes a housing portion having a side wall and an end wall which cooperate to define a cord receiving recess. The housing portion has a first opening therein which is located oppositely from the end wall and a second opening through which the cord normally passes. A lid is pivotally connected to the housing portion and is shiftable between an open position exposing the first opening and a closed position covering the first opening in the housing portion. The lid is designed with an opening therein to expose a part of the first opening in the housing portion when the lid is in its closed position. The opening in the lid accommodates the cord as it passes through the housing portion to a power supply with the lid in its closed position. Means are provided for releasably locking the lid in its closed position. A door is carried by one of the housing portion and lid and is shiftable so as to close the opening in the lid when the lid is in its closed position and the power cord retracted.

Accordingly, it is an object of this invention to provide a hatch for a power supply cord which can be sealed from the elements, insects and rodents during all uses of the hatch.

Another object of this invention is to provide a hatch for a power supply cord which is of economical construction and which is constructed so that the interior of the hatch can be sealed with or without the power supply cord extending from the hatch.

Still another object of this invention is to provide a power supply cord hatch which includes a housing portion and a lid having an opening therein through which said cord extends when connected to a power supply and over which a sliding closure is positioned when the cord is retracted and the lid is closed.

Other objects of this invention will become apparent upon a reading of the invention's description.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 4:
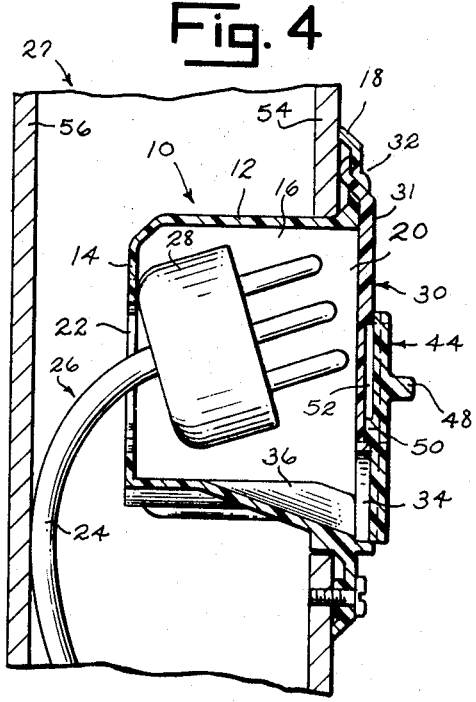
FIG. 4 is a sectional view taken along line 4—4 of FIG. 2.
Figures 5, 6:
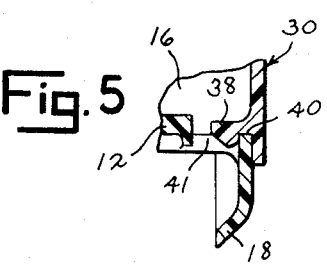
FIG. 5 is a fragmentary detailed sectional view taken along line 5—5 of FIG. 3.
FIG. 6 is a fragmentary detailed sectional view taken along line 6—6 of FIG. 3.

The hatch shown in FIGS. 1–6 includes a housing portion 10 having a side wall 12 and an end wall 14. Sdie wall 12 and end wall 14 cooperate to define a recess 16. Side wall 12 may be substantially annular or of a box-like configuration and has an outturned annular flange 18 defining a front opening 20 into recess 16. End wall 14 of housing portion 10 has an opening 22 formed therein which is large enough to accommodate the flexible body 24 of a power supply cord 26. Cord 26 is several feet in length and is connected at one end to suitable power terminals (not shown) within a structure 27. Structure 27 may constitute a mobile home, travel trailer, camper, or other living unit. The other end of cord 26 carries a plug 28. The transverse dimension of opening 22 is smaller than the transverse dimension of plug 28 of cord 26 so that plug 28 will abut end wall 14 and be retained within recess 16, as shown in FIG. 4, when the power supply cord is in its retracted position.

A lid 30 is pivotally connected at 32 to housing portion 10 and is shiftable between the closed position shown in FIGS. 1–4 and an open position whereby the user of the hatch can reach into recess 16 to grasp plug 28 for pulling body 24 of the power supply cord 26 through housing portion 10 to connect the plug to an external power supply or outlet. Lid 30 has an opening 34 formed in its lower marginal edge. Opening 34 is preferably oppositely located from the pivot connection of the lid to housing portion 10. An inclined trough 36 is formed in the bottom of side wall 12 of housing portion 10 and is aligned with opening 34 in lid 30 when the lid is located in its closed position. A flexible catch 38 is carried by lid 30 along its outer margin at each side of opening 34 therein. Each catch 38 is cammed upwardly and over the inner marginal edge 40 of housing portion flange 18 into an opening 41 in side wall 12 of the housing portion to releasably lock the lid in its closed position. Catches 38 possess sufficient flexibility to allow themselves to be cammed upwardly and forwardly over marginal edge 40 of the housing portion when it is desired to open lid 30.

Lid 30 is designed with two laterally spaced inturned retainer parts 42 which are located on opposite sides of and preferably just above opening 34 in the lid. Retainer parts 42 protrude forwardly from the outer face 31 of lid 30. A sliding door 44 is carried by lid 30. Door 44 is shiftable between the open position shown in FIG. 1 to expose lid opening 34 and the closed position shown in FIG. 2 to cover opening 34. Door 44 includes spaced marginal sections 46 along its sides and of reduced thickness which fit slidably under retainer parts 42 of the lid. A tab 48 protrudes from the outer face of door 44 and may be grasped to shift the door between its open and closed positions and to open the lid. A small protrusion 50 is formed in the inner face of door 44. Protrusion 50 fits within a vertically oriented elongated indentation 52 formed in the outer face 31 of lid 30 and serves in conjunction with the ends of indentation 52 as a stop to limit the movement of door 44 as it shifts between its open and closed positions. Opening 34 in lid 30 is preferably designed so as to be only slightly larger than the diameter of body 24 of power supply cord 26. Housing portion 10, lid 30 and door 44 may be formed of metal or molded plastic.

Figure 1:
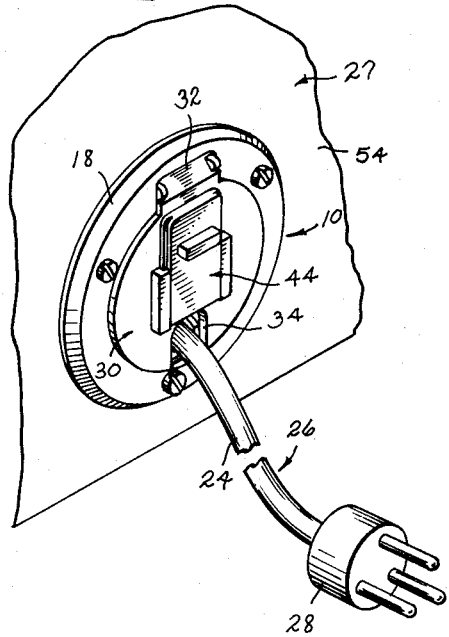
FIG. 1 is a perspective view of the hatch of this invention shown attached to a side wall of a structure with the power supply cord extending therefrom.
Figure 2:
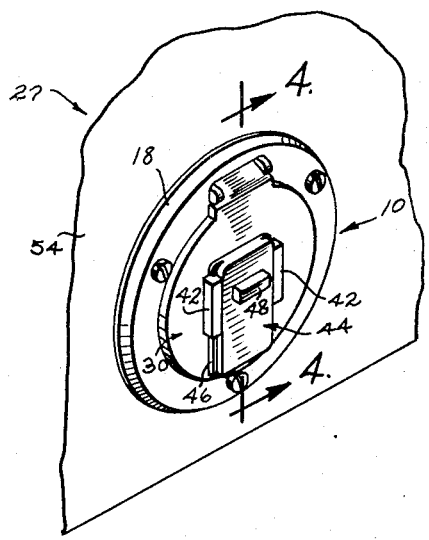
FIG. 2 is a perspective view of the hatch of FIG. 1 shown with the power supply cord in its retracted position and the lid of the hatch releasably secured to the housing portion of the hatch.
Figure 3:
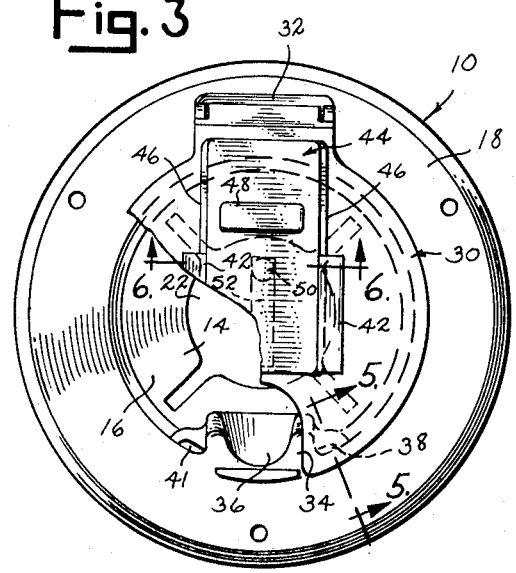
FIG. 3 is a front view of the hatch with the lid thereof in its closed position and with portions of the lid broken away for purposes of illustration.

Housing portion 10 of the hatch is secured by screws, nails, rivets, or similar securement means to the outside wall 54 of structure 27. Side wall 12 and end wall 14 of the housing portion protrude into an opening in outer wall 54 and terminate within the space between the outer wall and the inner wall 56 of the structure. When lid 30 of the hatch is in its closed position as illustrated in FIGS. 2 and 4, body 24 of power supply cord 26 extends downwardly between walls 54 and 56 of the structure with plug 28 being retained within recess 16 of the housing portion. After opening lid 30, plug 28 lying within recess 16 is grasped and the power supply cord pulled from the housing portion. Trough 36 formed in housing portion 10 serves to support body 24 of the cord when the cord is in its extended position and connected to an exterior power source. Once cord 26 has been extended and connected to the power source, cover 30 may be closed with door 44 positioned as shown in FIG. 1. When it is desired to detach the power supply cord from the power source and to store the cord, the lid 30 is opened and the cord body 24 fed rearwardly through opening 22 in the housing portion. Once the cord body has been stored behind housing portion 10 and the plug seated within recess 16, lid 30 is closed and door 44 shifted downwardly to cover opening 34 in the lid.

It is to be understood that the invention is not to be limited to the details herein given but may be modified within the scope of the appended claims.

What I claim is:

1. A hatch for a power supply cord having a flexible body, said hatch including a housing portion having a side wall and end wall which cooperate to define a cord receiving recess, said housing portion having a first opening therein oppositely located from said end wall and a second opening therein through which said cord will normally pass, both said first and second openings communicating with said recess, a lid, means pivotally connecting said lid to said housing portion to allow said lid to shift between a closed position covering said first opening and an open position exposing said first opening and said recess, the improvement wherein said lid has an opening formed therein to expose a part of said first opening when said lid is in its closed position, said lid opening having a transverse dimension exceeding the transverse dimension of the flexible body of said cord so as to accommodate said cord body when said lid is in its closed position and said cord body extends through said lid opening, means releasably locking said lid in its closed position, door means carried by one of said housing and lid and being shiftable over said lid to close the opening therein when said lid is in its closed position and said cord body is withdrawn from said lid opening, said door means including parts engaging retainer means carried by said lid to cause said door to be shiftable on said lid and over said opening therein, said retainer means carried by said lid including spaced, inturned retainer parts protruding outwardly from the outer face of said lid, said door means fitting between and including marginal sections fitting under said retainer parts and being urged thereby against the outer face of said lid.

2. The hatch of claim 1 and stop means cooperatively carried by said lid and door means for limiting the extent of movement of said door means on said lid outer face.

3. The hatch of claim 1 wherein said housing portion side wall defines a trough means at the bottom of the recess for accommodating the body of said cord as the cord extends through said lid opening, said opening in said lid being located at the bottom edge of the lid in alignment with said trough means.

* * * * *